US010250935B2

(12) United States Patent
Park et al.

(10) Patent No.: US 10,250,935 B2
(45) Date of Patent: Apr. 2, 2019

(54) ELECTRONIC APPARATUS CONTROLLED BY A USER'S VOICE AND CONTROL METHOD THEREOF

(71) Applicant: SAMSUNG ELECTRONICS CO., LTD., Suwon-si (KR)

(72) Inventors: Eun-hee Park, Guri-si (KR); So-yon You, Seoul (KR); Sang-jin Han, Gunpo-si (KR); Jae-kwon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/149,574

(22) Filed: Jan. 7, 2014

(65) Prior Publication Data

US 2014/0196087 A1    Jul. 10, 2014

(30) Foreign Application Priority Data

Jan. 7, 2013 (KR) .................. 10-2013-0001776

(51) Int. Cl.
*H04N 21/485* (2011.01)
*H04N 21/422* (2011.01)
*G10L 15/22* (2006.01)
*H04N 21/472* (2011.01)

(52) U.S. Cl.
CPC ....... *H04N 21/42203* (2013.01); *G10L 15/22* (2013.01); *H04N 21/472* (2013.01); *G10L 2015/223* (2013.01)

(58) Field of Classification Search
CPC ... G06F 3/167; G10L 15/22; H04N 21/42203; H04N 21/472; H04N 1/00403; H04N 1/32784; H04N 2005/4432; H04N 21/4415
See application file for complete search history.

(56) References Cited

U.S. PATENT DOCUMENTS

| 8,499,320 B2* | 7/2013 | Yeh et al. ................. 725/37 |
| 2002/0052746 A1* | 5/2002 | Handelman ............ H04N 7/163 704/270 |

(Continued)

FOREIGN PATENT DOCUMENTS

| EP | 2 533 242 A1 | 12/2012 |
| GB | 2467451 A | 8/2010 |

(Continued)

OTHER PUBLICATIONS

International Search Report dated Feb. 17, 2014 issued by the International Searching Authority in counterpart Application No. PCT/KR2013/009606 (PCT/ISA/210).

(Continued)

*Primary Examiner* — Rong Le
(74) *Attorney, Agent, or Firm* — Sughrue Mion, PLLC

(57) ABSTRACT

An electronic apparatus is provided. The electronic apparatus includes a voice input which is configured to receive a user's voice, a display configured to provide a user interface (UI) screen including at least one object, and a controller which is configured to determine whether or not it is possible for the user's voice to call the object, assign to the object an identification tag which identifies the object based on a result of the determination, and display the identification tag-assigned object.

16 Claims, 8 Drawing Sheets

(56) References Cited

U.S. PATENT DOCUMENTS

| | | | |
|---|---|---|---|
| 2003/0005461 A1* | 1/2003 | Shinohara | H04N 7/0885 725/110 |
| 2003/0125956 A1* | 7/2003 | Lewis | G10L 15/193 704/275 |
| 2005/0210416 A1 | 9/2005 | MacLaurin et al. | |
| 2005/0268214 A1 | 12/2005 | Lu | |
| 2007/0118382 A1 | 5/2007 | Kuboyama et al. | |
| 2011/0159885 A1 | 6/2011 | Song et al. | |
| 2011/0221745 A1* | 9/2011 | Goldman | G06Q 30/02 345/419 |
| 2012/0167153 A1 | 6/2012 | Ryu et al. | |

FOREIGN PATENT DOCUMENTS

| | | |
|---|---|---|
| JP | 2009-169883 A | 7/2009 |
| KR | 2001-0015934 A | 3/2001 |
| KR | 10-2011-0035036 A | 4/2011 |
| KR | 10-2012-0135855 A | 12/2012 |
| WO | 2012/169737 A3 | 12/2012 |

OTHER PUBLICATIONS

Written Opinion dated Feb. 17, 2014 issued by the International Searching Authority in counterpart Application No. PCT/KR2013/009606 (PCT/ISA/237).

Communication dated Jun. 8, 2016 issued by the European Patent Office in counterpart European Patent Application No. 13869992.1.

Communication dated Sep. 30, 2016, issued by the Korean Intellectual Property Office in counterpart Korean Patent Application No. 10-2013-0001776.

Communication dated Apr. 3, 2018, issued by the Korean Intellectual Property Office in counterpart Korean application No. 10-2017-0057482.

Communication dated Dec. 19, 2018, issued by the Korean Patent Office in counterpart Korean Application No. 10-2017-0057482.

* cited by examiner

ELECTRONIC APPARATUS CONTROLLED BY A USER'S VOICE AND CONTROL METHOD THEREOF

CROSS-REFERENCE TO RELATED APPLICATION

This application claims priority from Korean Patent Application No. 10-2013-0001776, filed on Jan. 7, 2013, in the Korean Intellectual Property Office, the disclosure of which is incorporated herein by reference, in its entirety.

BACKGROUND

1. Field

Apparatuses and methods consistent with exemplary embodiments relate to an electronic apparatus and a control method thereof. More particularly, the exemplary embodiments relate to an electronic apparatus controlled by a user's voice and a method of controlling the apparatus.

2. Description of the Related Art

With development of electronic technology, various kinds of electronic apparatuses have developed and become widespread. These apparatuses have increasingly become equipped with various functions, depending on user needs. In particular, televisions (TVs) have recently provided access to the Internet in order to support Internet service. As a result, users may watch a large number of digital broadcast channels through televisions.

In the recent years, voice recognition technology has been developed to more conveniently and intuitively control electronic apparatuses. In particular, a TV may recognize a users' voice and may perform functions which correspond to the users' voices, such as volume adjustment or channel change.

However, using a known method of controlling voice recognition search menus on a screen, one by one, through a focus using limited navigation commands, usability is degraded.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments are to provide an electronic apparatus capable of easily calling an object by using voice recognition technology and a method of controlling voice recognition.

According to an aspect of an exemplary embodiment, there is provided an electronic apparatus controlled by a user's voice. The electronic apparatus may include: a voice input which is configured to receive a user's voice; a display configured to provide a user interface (UI) screen which includes at least one object; and a controller configured to determine whether or not calling, by the user's voice, to the object is possible, assigning an identification tag which identifies the object to the object based on a determination result, and displaying the identification tag-assigned object.

The controller may assign and display the identification tag to the object when a text item which enables voice calling to the object is not tagged to the object.

The object to which the text item is not tagged may be an object having a thumbnail attribute or may have a list attribute.

The controller may perform a task for the identification of the tag-assigned object when the identification tag is called by the user's voice.

The controller may sequentially assign identification tags to objects based on a displayed order of the objects on the UI screen and may display the identification tag-assigned objects.

The identification tags may include at least one of a number tag having a preset order and an alphabet tag having a preset order.

The controller may assign and display a preset graphic user interface (GUI) which indicates to at least one of the identification tag and a text item which is callable by the user's voice that the voice calling is possible.

According to an aspect of an exemplary embodiment, there is provided a method of controlling an electronic apparatus with a user's voice. The control method may include: receiving a user command which provides a user interface (UI) screen including at least one object; determining whether or not calling the object using by a user's voice is possible; and assigning an identification tag which identifies the object based on a determination result and displaying the identification tag-assigned object.

The determining whether or not calling is possible may include determining that the calling is impossible when a text item which enables voice calling to the object is not tagged to the object and the displaying may include assigning and displaying the identification tag to the object upon determination that voice calling is impossible.

The object to which the text item is not tagged may be an object having a thumbnail attribute or may have a list attribute.

The method of controlling an electronic apparatus may further include performing a task for the identification tag-assigned object, when the identification tag is called by the user's voice.

The displaying may include sequentially assigning and displaying identification tags to objects on the UI screen based on a displayed order of the objects.

The identification tags may be at least one of a number tag having a preset order and an alphabet tag having a preset order.

The displaying may include assigning and displaying a preset graphic user interface (GUI) which indicates that voice calling is possible to at least one of the identification tag and a text item which is callable by the user's voice.

Another exemplary embodiment may provide an electronic apparatus controlled by a user's voice, the electronic apparatus including: a controller configured to determine whether or not it is possible for a user's voice to call an object, assign to the object an identification tag which identifies the object based on a result of the determination, and display the identification tag-assigned object. The apparatus may further include a voice input configured to receive a user's voice. A display may be configured to provide a user interface (UI) screen including at least one object.

The controller may assign and display the identification tag to the object in response to a text item which enables voice calling to the object not being tagged to the object. The object to which the text item is not tagged may be an object having a thumbnail attribute or a list attribute. In addition, the controller may perform a task of identifying a tag-assigned object when the identification tag is called by the user's voice.

According to the various exemplary embodiments, the electronic apparatus may be easily controlled by using voice recognition technology.

Additional aspects and advantages of the exemplary embodiments will be set forth in the detailed description, will be obvious from the detailed description, or may be learned by practicing the exemplary embodiments.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF THE EXEMPLARY EMBODIMENTS

Figure 1:
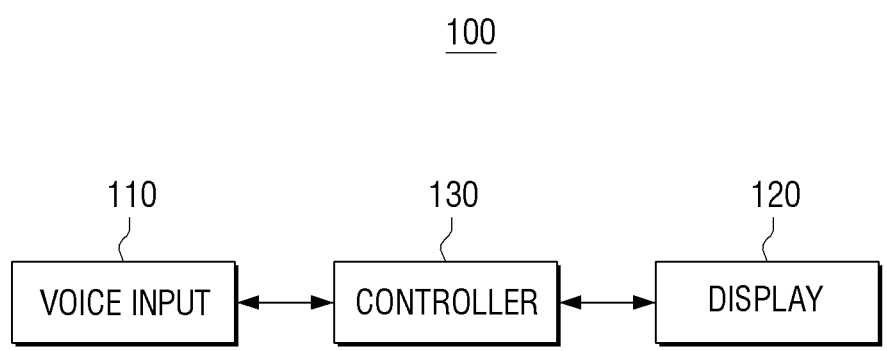
FIG. 1 is a block diagram which illustrates a configuration of an electronic apparatus, according to an exemplary embodiment.

Hereinafter, exemplary embodiments will be described in more detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a block diagram which illustrates a configuration of an electronic apparatus, according to an exemplary embodiment.

An electronic apparatus 100 as illustrated in FIG. 1 includes a voice recognition input 110, a display 120 and a controller 130.

The electronic apparatus 100 may be a smart TV, but this is merely an exemplary embodiment and the electronic apparatus 100 may be implemented with various electronic apparatuses such as a smart phone, a tablet personal computer (PC) and a laptop PC.

The electronic apparatus 100 may be implemented to recognize voice by a natural utterance of a person and may perform a voice recognition function which is received as an execution command. Herein, the voice recognition is to automatically identify linguistic meaning contents from the voice. Specifically, the voice recognition is a process of inputting a voice waveform, identifying a word or a word string, and extracting meaning, and may be performed through processes of voice analysis, phonemic recognition, word recognition, sentence interpretation, and meaning extraction. A detailed description thereof will be omitted.

The voice input 110 receives a user's uttered voice. The voice input 110 converts the input voice signal into an electrical signal and outputs the electrical signal to the controller 130. The voice input 110 may be implemented as a microphone. Further, the voice input 110 may be implemented in all-in-one form with the electronic apparatus 100 or separate from the electronic apparatus 100. The separate voice input 110 may be connected to the electronic apparatus 100 in a wired or wireless manner.

The display 120 displays an image which corresponds to a broadcast signal received through a broadcast receiver. The display 120 may display image data (for example, a moving image) input through an external terminal input.

In particular, the display 120 may display a UI screen including various objects. For example, the display 120 may display the UI screen including a plurality of thumbnails which correspond to movie contents in a UI screen configured to provide a plurality of movie contents.

The controller 130 controls the voice input 110 and the display 120. Herein, the controller 130 may include a module implemented as a central processing unit (CPU), a read only memory (ROM), and a random access memory (RAM), which are configured to store data.

In particular, the controller 130 may determine whether or not it is possible to use a voice to call an object displayed in the display 120 and assign and display an identification tag which identifies the object based on the result of the determination.

Specifically, the controller 130 may determine whether or not it is impossible to call the user's voice when a text item which enables the voice calling to the object is not tagged to the object, and whether or not it is possible to assign and display the identification tag to the object.

For example, in general, an object having a thumbnail attribute or a list attribute does not have the text item in which the user may use their voice to call the object. Therefore, the controller may assign the identification tag which allows the user to identify and, call the object to the object, and may enable voice calling of the user.

At this time, the controller 130 may sequentially assign and display identification tags on a UI screen based on a displayed order of objects. Here, the identification tag may be one of a number tag having a preset order and an alphabet tag having a preset order. However, the identification tag is not limited thereto.

For example, when five movie thumbnails are displayed on a screen, the controller 130 may assign a first identification tag to a fifth identification tag according to the displayed order and may allow the user to call the desired movie thumbnail in a voice using the identification tags.

Further, the controller 130 may assign and display a preset GUI which indicates to a calling text which is callable by a voice that calling is possible. The above-described identification tag may be included in the text item which is callable by voice. However, in addition to the identification tag, other text items which are callable by voice may be included.

For example, a specific menu item is configured in a text called "Sub category" which is callable by voice, the controller may assign and display a preset GUI to a corresponding text. Here, the preset GUI indicating that calling is possible may be a GUI having the form of a quotation mask, but the GUI is not limited thereto. For example, any GUI configured to allow the user to recognize that calling is possible, such as a SUI having the form of a speech bubble, may be applied.

Further, the controller 130 may control the identification tag-assigned object to be called when the identification tag is called by the user's voice input through the voice input 110. For example, the controller 130 may determine that the object to which the identification tag called "1" is assigned is called when "1" is called by the user's voice and may perform a task which corresponds to a corresponding object. Here, the task which corresponds to the corresponding object is a predefined job executable by an apparatus through the calling of the corresponding object. For example, when a content to which the identification tag called "1" is assigned is a moving image content, the task may be a job which reproduces the corresponding content or which displays a detailed item of the corresponding content.

Hereinafter, a method of recognizing a user's voice input through the voice input 110 by the controller 130 will be described in brief.

The controller 130 recognizes a voice using a voice recognition module and a voice database, when the voice is input through the voice input 110. The voice recognition is divided into isolated word recognition which recognizes an uttered voice through classification of words, continuous speed recognition which recognizes continuous words, continuous sentences, and dialogic voices, and keyword spotting which is a middle form between the isolated word recognition and the continuous speech recognition, and detects and recognizes a predetermined keyword.

When the user's voice is input, the controller 130 detects a start and an end of the user's uttered voice in the input voice signal to determine a voice period. The controller 130 may calculate the energy of the input voice signal, classify an energy level of the voice signal according to the calculated energy, and detecting the period of the voice through dynamic programming. The controller 130 detects a phoneme which is a minimum unit of the voice from the voice signal in the detected voice period based on an acoustic model and generates phonemic data. The controller 130 generates text information by applying a hidden Markov model (HMM) which is a probabilistic model to the generated phonemic data. However, as described above, the voice recognition method of the user is merely an exemplary embodiment and the user's voice may be recognized through other methods. Therefore, the controller 130 may recognize the user's voice included in the voice signal. As described above, the controller 130 performs a task of the electronic apparatus using the recognized voice.

Figure 2:
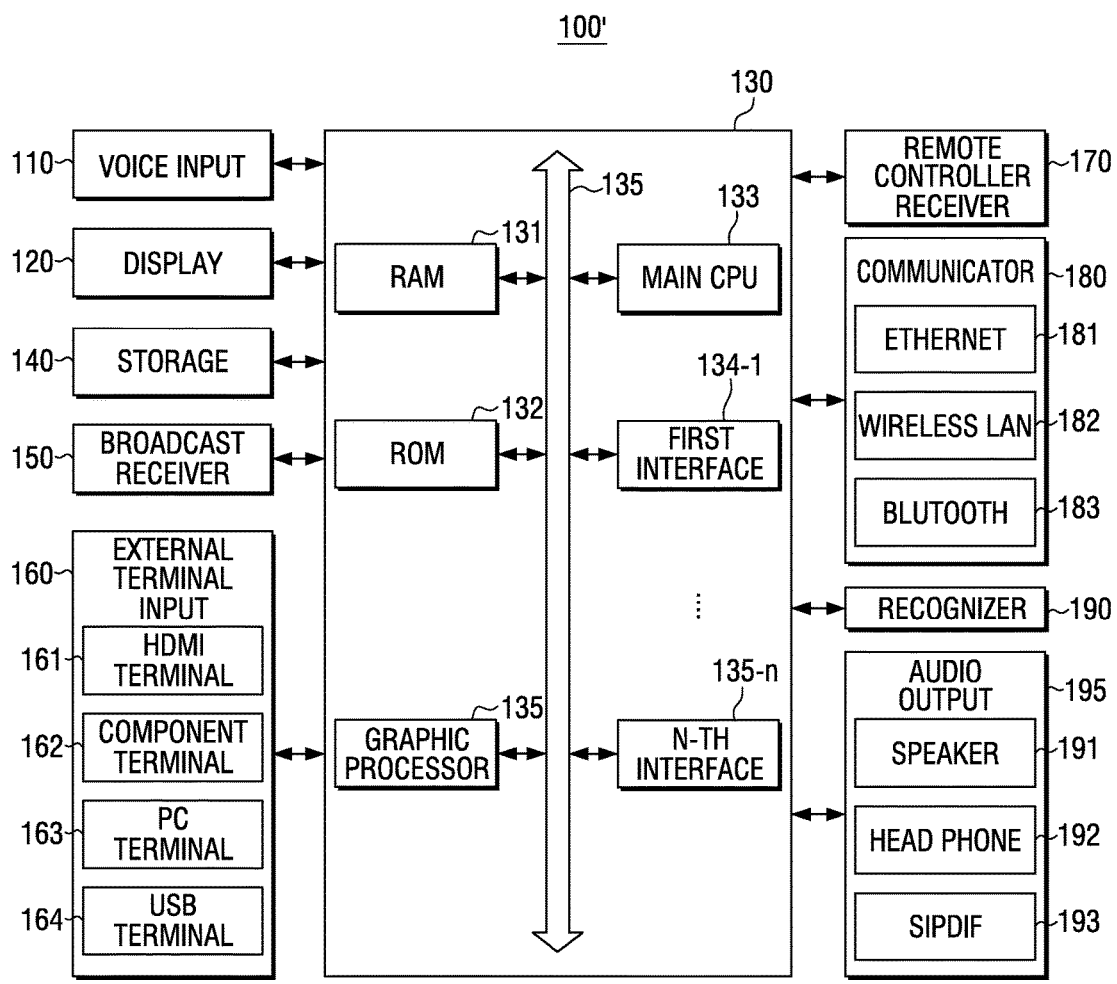
FIG. 2 is a block diagram which illustrates a configuration of an electronic apparatus, according to another exemplary embodiment.

FIG. 2 a block diagram which illustrates a configuration of an electronic apparatus according to another exemplary embodiment. Referring to FIG. 2, an electronic apparatus 100' includes a voice input 110, a display 120, a controller 130, a storage 140, a broadcast receiver 150, an external terminal input 160, a remote controller signal receiver 170, a communicator 180, a recognizer 190, and an audio output 195.

Detailed description of the portions of the components illustrated in FIG. 2 which are the same as in the components illustrated in FIG. 1 will be omitted to avoid obscuring the invention.

The controller 130 includes a RAM 131, a ROM 132, a main CPU 133, a graphic processor 134, a first interface 135-1 to an n-th interface 135-n, and a bus 136.

The RAM 131, the ROM 132, the main CPU 133, the graphic processor 134, and the first to n-th interfaces 135-1 to 135-n may be connected to each other through the bus 136.

The first to n-th interfaces 135-1 to 135-n are connected to the above-described components. One of the interfaces may be a network interface connected to an external apparatus through a network.

The main CPU 133 accesses the storage 140 to perform booting using operation system (O/S) stored in the storage 140. The main CPU 133 performs various operations using various programs, contents, data, and the like, stored in the storage 140.

A comment set and the like for system booting is stored in the ROM 132. When a turn-on command is input and power is supplied, the main CPU 133 copies the O/S stored in the storage 140 to the RAM 131 according to the command stored in the ROM 132 and executes the O/S to boot the system. When the booting is completed, the main CPU 133 copies various application programs stored in the storage 140 to the RAM 131 and executes the application programs copied to the RAM 131 to perform various operations.

The graphic processor 134 generates a screen including various objects such as an icon, an image, and a text using a calculator (not shown) and a renderer (not shown). The calculator (not shown) calculates an attribute value such as a coordinate value in which each of the objects is to be displayed; a shape, a size, and a color according to a layout of the screen. The renderer (not shown) generates screens having various layouts including the objects based on the attribute value calculated in the calculator (not shown). The screen generated in the renderer (not shown) is displayed in a display region of the display 120.

The storage 140 stores various data and programs for driving and controlling the electronic apparatus 100'. The storage 140 may include a voice recognition module configured to recognize the voice input through the voice input 110 and a voice database. The voice database means a database in which a preset voice and a voice task matching the preset voice are stored.

The broadcast receiver 150 receives a broadcast signal from the outside in a wired or wireless manner. The broadcast signal includes a video signal, an audio signal, and additional data (for example, electronic program guide (EPG)). The broadcast receiver 150 may receive a broadcast signal from various sources such as a terrestrial broadcasting, cable broadcasting, satellite broadcasting and Internet broadcasting.

The external terminal input 160 receives image data (for example, a moving image, a photo, and the like), audio data (for example, music and the like), and the like, from outside of the electronic apparatus 100'. The external terminal input 160 may include at least one selected from the group consisting of a high-definition multimedia interface (HDMI) input terminal, a component input terminal, a PC input terminal, and a universal serial bus (USB) input terminal. The remote controller signal receiver 170 may receive a remove controller signal even when the electronic apparatus 100' is in a voice task mode or in a motion task mode.

The communication 180 may connect the electronic apparatus 100' and an external apparatus (not shown) through control of the controller 130. Specifically, the communicator 180 may provide a communication method such as Ethernet 181, a wireless local area network (LAN) 182, and Bluetooth 183. However, the communication method of the communicator 180 is not limited thereto.

Here, the external apparatus may be implemented as an automatic speech recognition (ASR) server and an interactive server configured to provide interactive service.

That is, the electronic apparatus 100' be implemented to provide various interactive services as well as to perform a task according to simple voice recognition and description thereof, which will be made later with reference to FIG. 4.

Further, the external apparatus may be implemented with a server configured to download an application or perform web browsing.

The recognizer 190 outputs a voice through audio output 195, which corresponds to a broadcast signal by control of the controller 130. The audio output 195 may include at least one output selected from the group including a speaker 191, a head phone output terminal 192, and a Sony/Philips digital interface (S/PDIF) output terminal 193.

Figure 3:
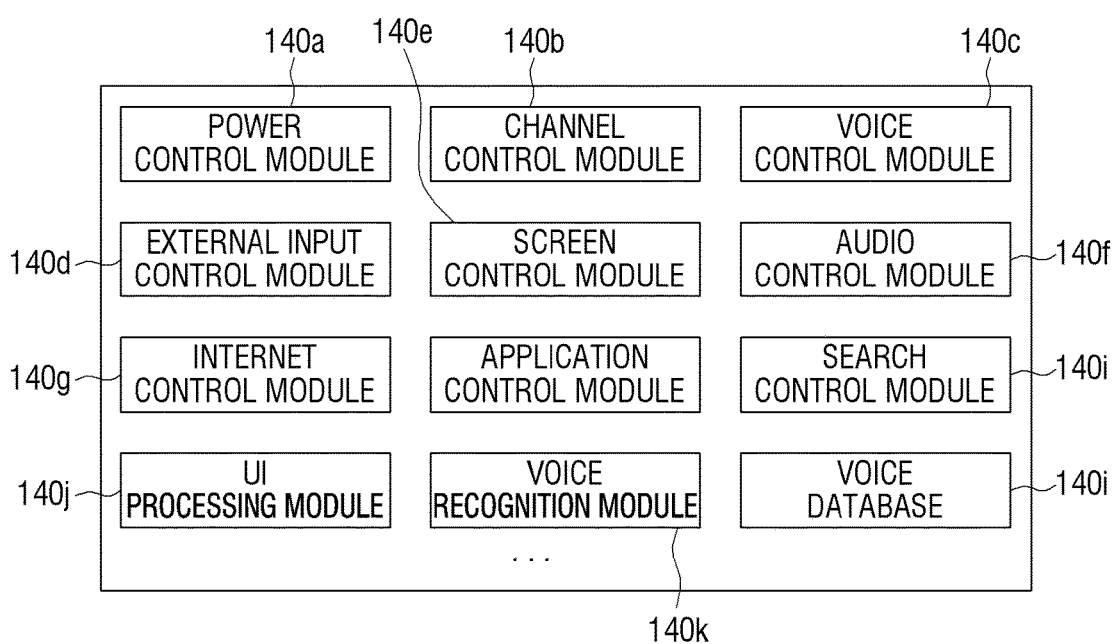
FIG. 3 is a view which illustrates a software configuration stored in a storage, according to an exemplary embodiment.

FIG. 3 is a view which illustrates a configuration of software stored in a storage according to an exemplary embodiment.

As illustrated in FIG. 3, the storage 140 includes a power control module 140a, a channel control module 140b, a volume control module 140c, an external input control module 140d, a screen control module 140e, an audio control module 140f, an Internet control module 140g, an application control module 140h, a search control nodule 140i, a UI processing module 140j, a voice recognition module 140k, a voice database 140l. The modules 140a to 140l may be implemented with software to respectfully perform a power control functions, a channel control function, a volume control function, an external input control function, a screen control function, an audio control function, an Internet control function, an application execution function, a search control function and a UI processing function. The controller 130 may execute the software stored in the storage 140 to perform a corresponding function. For example, the controller 130 may recognize the user's voice using the voice recognition module 140k and the voice database 140l and perform a task which corresponds to the recognized voice.

Figure 4:
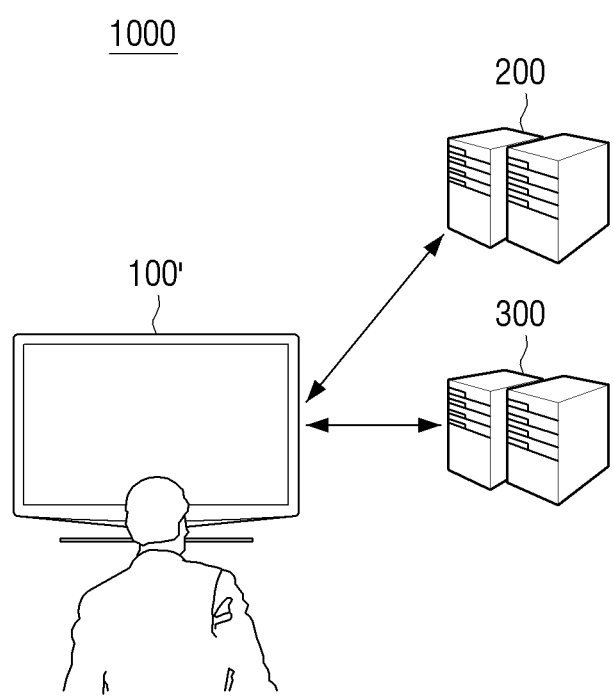
FIG. 4 is a view which illustrates an interactive system, according to an exemplary embodiment.

FIG. 4 is a view illustrating an interactive system 1000 according to an exemplary embodiment. As illustrated in FIG. 4, the interactive system 1000 includes an electronic apparatus 100,' a first server 200, and a second server 300.

The electronic apparatus 100' may be implemented with the electronic apparatus 100' illustrated in FIG. 2 and may perform various tasks according to a user's voice.

Specifically, the electronic apparatus 100' outputs a response message which corresponds to the user's voice or performs a task which corresponds to the user's voice.

Therefore, if necessary, the electronic apparatus 100' transmits the collected user's voice to the first server 200 (for example, an ASR server). When the user's voice is received from the electronic apparatus 100', the first sever 200 converts the received user's voice into text information (or a text) and transmits the text information to the electronic apparatus 100'.

The electronic apparatus 100' transmits to the second server 300 the text information received from the first server 200. When the text information is received from the electronic apparatus 100', the second server 300 (for example, an interactive server) generates response information which corresponds to the received text information and transmits the generated response information to the electronic apparatus 100'.

The electronic apparatus 100' may perform various operations based on the response information received from the second server 300.

Specifically, the electronic apparatus 100' may output the response message which corresponds to the user's voice. Here, the response message may be output as at least one of a voice and a text. For example, when the user's voice inquiries regarding the broadcast time of a specific program, the electronic apparatus 100' may output the broadcast time of the specific program in a voice or text form, or in a combination thereof.

Further, the electronic apparatus 100' may perform a task which corresponds to the user's voice. For example, when the user's voice for channel change is received, the electronic apparatus 100' may tune a corresponding channel and display the tuned channel.

At this time, the electronic apparatus 100' may provide a response message which corresponds to the corresponding task. That is, the electronic apparatus 100' may output information for the task performed according to the user's voice in a voice or text form, or in a combination thereof. In the above-described example, the electronic apparatus 100' may output information for the changed channel or a message which indicates that the channel change is completed through at least one of a voice or a text.

Hereinafter, UI providing methods according to various exemplary embodiments will be described with reference to FIGS. 5 to 7.

Figure 5:
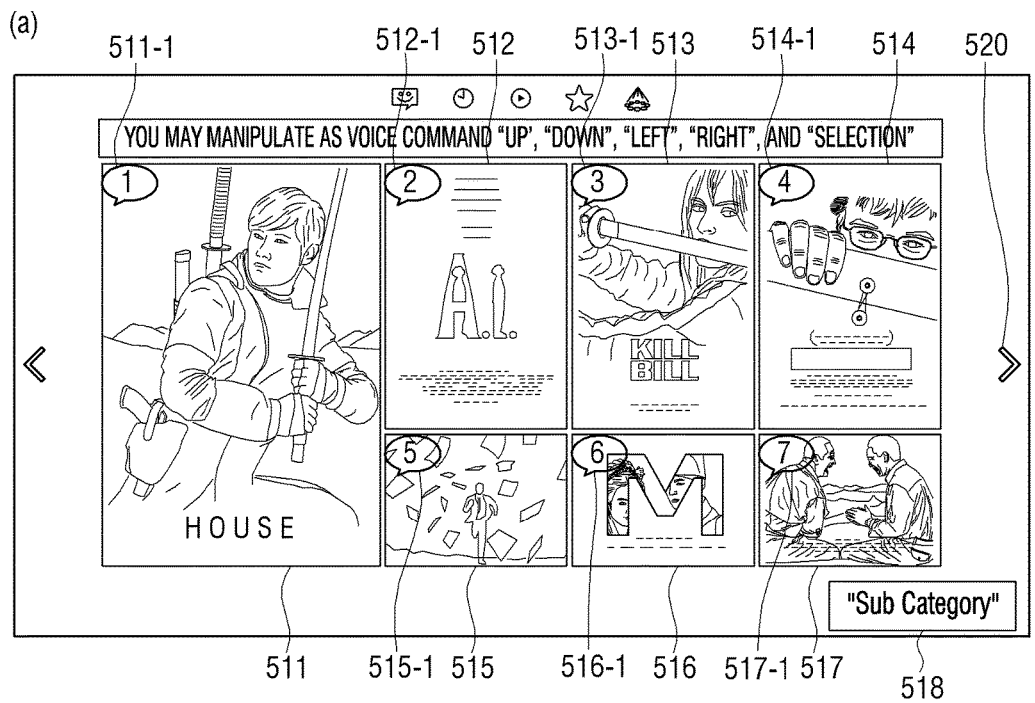
FIGS. 5 to 7 are views which illustrate UI providing methods, according to various exemplary embodiments.
Figure 5:
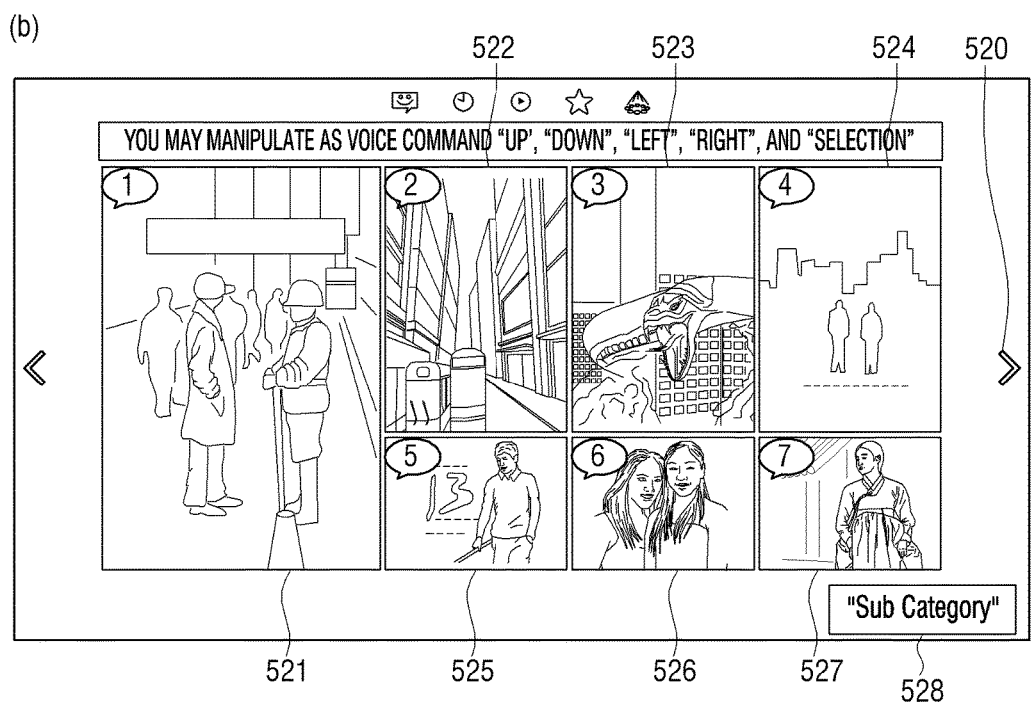

FIG. 5 a view illustrating a UI providing a method according to an exemplary embodiment.

As illustrated in FIG. 5(a), a UI screen including a plurality of objects 511 to 518 may be displayed on a screen.

In the UI screen illustrated in FIG. 5(a), it is assumed that the objects 511 to 517 indicating movies thumbnails are objects to which a calling text which enables voice calling is not tagged, and the object 518 indicating a specific menu item is an object to which the calling text which enables the voice calling is tagged.

At this time, identification tags 511-1 to 517-1 which identify corresponding objects may be assigned to the objects 511 to 517 which indicate the movie thumbnails. Here, the identification tags may be tags which identify the corresponding objects by voice and may be assigned in a number form which is easily recognizable by the user. However, the identification tags are not limited thereto.

On the other hand, a calling text called "sub category" is tagged to the object 518 which indicates the specific menu item and a separate identification tag may be not assigned to the object 518.

FIG. 5(b) illustrates a state in which a next UI page is displayed by selection of an item 520 which displays a UI page next to the UI page illustrated in FIG. 5(a).

A plurality of movie thumbnails 511 to 517 displayed on the UI page illustrated in FIG. 5(a) and other movie thumbnail objects 521 to 527 may be displayed on the UI page illustrated in FIG. 5(b).

At this time, identification tags which identify corresponding objects may be assigned to the corresponding thumbnail objects 521 to 522. As illustrated in FIG. 5(b), the identification tags may be number tags of 1 to 7 like the identification tags as illustrated in FIG. 5(a). This is because the identification tags are to simply identify the objects displayed on the displayed screen to be easily called in a voice and thus may be reused regardless of whether or not the identification tags are identification tags used in the previously displayed screen.

However, this is merely an exemplary embodiment and in some cases, number tags of 8 to 14 which are next orders of the identification tags illustrated in FIG. 5(a) may be assigned to the corresponding thumbnails objects 521 to 527.

Figure 6:
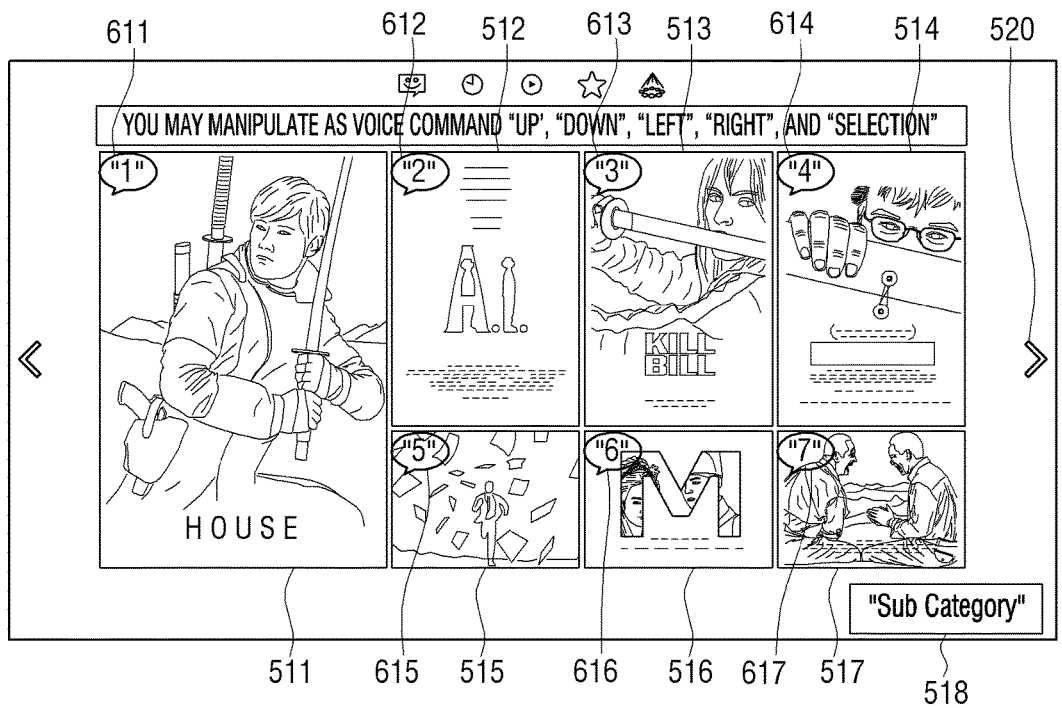

FIG. 6 is a view illustrating a UI providing method according to another exemplary embodiment.

As illustrated in FIG. 6, a preset GUI which indicates that the corresponding text is callable may be assigned to a text item which is callable.

For example, as illustrated in FIG. 6, GUIs 611 to 617 having a double-quotation mark form may be assigned to identification tags assigned to the thumbnail objects 511 to 517. Therefore, the user may intuitively recognize that the corresponding identification tag is a text which is callable in a voice.

Further, even in the object 518 indicating that a specific menu item to which a calling text called "sub category" is tagged, the "sub category" may be displayed to indicate that the "sub category" is a callable text.

Figure 7:
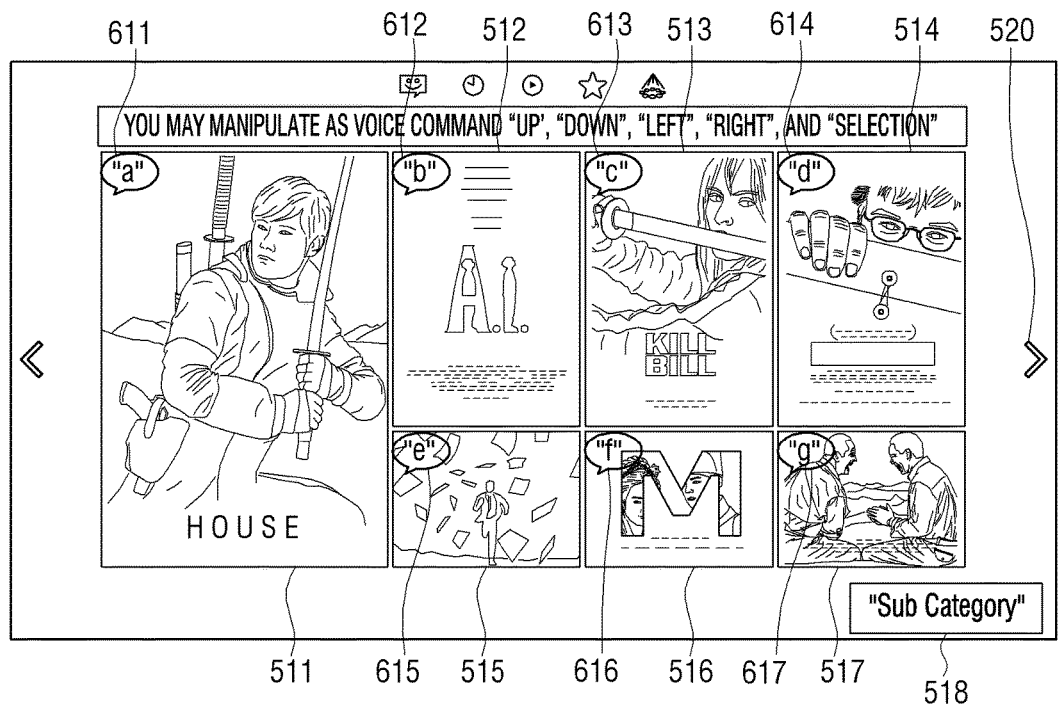

FIG. 7 is a view which illustrates a UI providing method according to another exemplary embodiment.

As illustrated in FIG. 7, alphabet tags may be assigned to thumbnail objects to which a calling text which enables voice calling, are not tagged in order to enable voice calling.

That is, any identification tag assigned to an object, which may be easily recognized by the user, may be not limited to numbers but applied in various forms.

The above-described exemplary embodiments have described the thumbnail image as an example of an object which is not callable by the user's voice, but it is merely an exemplary embodiment and the concept may be applied to other objects which are not callable by the user, such as a list.

Figure 8:
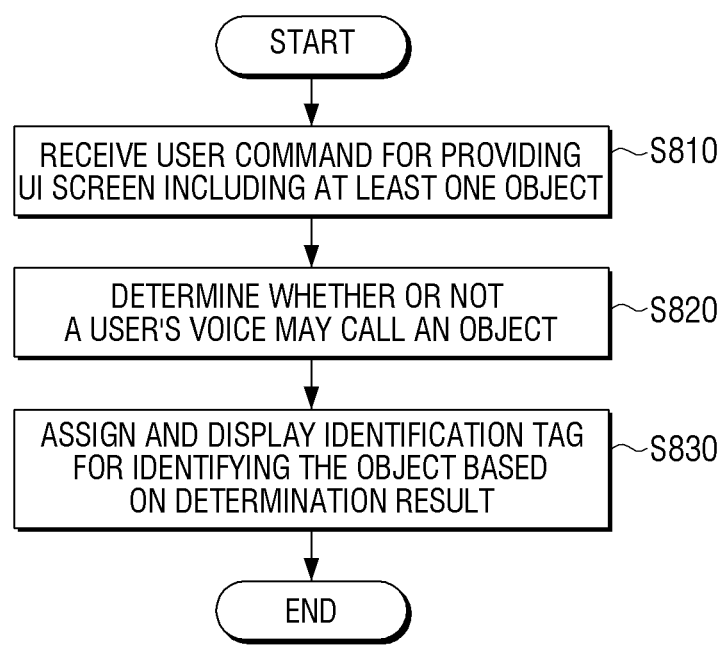
FIG. 8 is a flow chart which illustrates method of controlling an electronic apparatus, according to an exemplary embodiment.

FIG. 8 is a flow chart which illustrates a control method of an electronic apparatus according to an exemplary embodiment.

As illustrated in FIG. 8, in a control method of an electronic apparatus controlled by the user's voice according to the exemplary embodiment, the electronic apparatus first receives a user command for providing a UI screen including at least one object (S810).

The electronic apparatus determines whether or not it is possible for the user's voice to call the object in the UI screen (S820).

Next, the electronic apparatus assigns an identification tag which identifies the object to the object based on a determination result in step S820 and displays the identification tag-assigned object (S830).

At this time, in step S820 of determining whether or not calling is possible, the electronic apparatus may determine that calling is impossible when a text item which enables the user's voice calling the object is not tagged. Here, the object to which the text item is not tagged may be an object having a thumbnail attribute or may be a list attribute.

Further, in step S830 of displaying the identification tag-assigned object, the electronic apparatus may assign the identification tag to an object which is determined not to be callable in step S820 and may display the identification tag-assigned object.

Specifically, the electronic apparatus may sequentially assign and display identification tags based on a displayed order of objects on the UI screen. The identification tags may be at least one of a number tag having a preset order and an alphabet tag having a preset order.

When the identification tag assigned to the object is called by the user's voice, the electronic apparatus may determine that the identification tag-assigned object is called and may perform a task for a corresponding object.

Further, in step S830 of displaying the identification tag-assigned object, the electronic apparatus may assign and display a preset GUI which indicates that voice calling is possible to at least one of the identification tag assigned to the object and the text item, which is callable by the user's voice. Here, the text item which is callable by the user's voice means a text item which may be voice-recognizable and for example, the text item may include a menu title item assigned to the preset menu item.

Therefore, when the object is selected through voice recognition, the desired object may be selected without an additional focus manipulation.

The method of controlling an electronic apparatus according to the above-described various exemplary embodiments may be implemented with a program and may be provided to electronic apparatuses.

For example, a non-transitory computer-readable medium in which the program performing a configuration of determining whether or not it is possible for a user's voice to call the object when a user command for providing a UI screen including at least one object is received and assigning and displaying an identification tag which identifies the object based on a determination result is stored, may be provided.

The non-transitory computer-recordable medium is not a medium configured to temporarily store data such as a register, a cache, a memory, and the like but an apparatus-readable storage medium configured to semi-permanently store data. Specifically, the above-described applications or programs may be stored and provided in the non-transitory computer-recordable medium such as a compact disc (CD), a digital versatile disc (DVD), a hard disc (HD), a Blu-ray disc®, a USB, a memory card, a ROM, and the like.

Further, in the block diagram illustrating the electronic apparatus, although a bus is not illustrated, communication between the components of the electronic apparatus may be performed through the bus. In each device, a processor configured to perform the above-described various steps such as a CPU and a microprocessor may be further included.

The foregoing exemplary embodiments and advantages are merely exemplary and are not to be construed as limiting the present disclosure. The exemplary embodiments can be readily applied to other types of devices. Also, the description of the exemplary embodiments is intended to be illustrative, and not to limit the scope of the claims, as many alternatives, modifications and variations will be apparent to those skilled in the art.

What is claimed is:

1. An electronic apparatus controlled by a user's voice, the electronic apparatus comprising:
    a voice input unit configured to receive a user's voice;
    a display configured to display at least one first object and at least one second object, wherein the at least one second object includes a displayed text for voice calling and the at least one first object does not include the displayed text for voice calling; and
    a processor configured to:
        identify that the at least one first object does not include the displayed text for voice calling;
        assign at least one number tag to the at least one first object;
        control the display to display the assigned at least one number tag on the at least one first object; and
        control the display to display the at least one second object with a visual indicator by adding a visual indicator to the at least one second object,
    wherein the visual indicator visually distinguishes the displayed text for voice calling on the at least one second object to indicate that the displayed text is callable, wherein the visual indicator comprises at least one of a quotation mask or a speech bubble applied to the displayed text for voice calling.

2. The electronic apparatus as claimed in claim 1, wherein the processor performs a task of identifying a tag-assigned object when the at least one number tag is called by the user's voice.

3. The electronic apparatus as claimed in claim 1, wherein the processor sequentially assigns identification tags to objects on the display based on a displayed order of the objects and displays the identification tag-assigned objects.

4. The electronic apparatus as claimed in claim 3, wherein the identification tags includes at least one of a number tag having a preset order and an alphabet tag having a preset order.

5. The electronic apparatus as claimed in claim 1, wherein the processor assigns the visual indicator to at least one of the at least one first object and the at least one second object and displays the visual indicator.

6. The electronic apparatus of claim 1, wherein the visual indicator comprises a quotation mask applied to the displayed text for voice calling.

7. The electronic apparatus of claim 1, wherein the visual indicator comprises a speech bubble applied to the displayed text for voice calling.

8. A method of controlling an electronic apparatus by a user's voice, the control method comprising:
   displaying at least one first object and at least one second object, wherein the at least one second object includes a displayed text for voice calling and the at least one first object does not include the displayed text for voice calling;
   receiving a user command;
   identifying that the at least one first object does not include the displayed text for voice calling;
   assigning at least one number tag to the at least one first object;
   displaying the assigned at least one number tag on the at least one first object; and
   display the at least one second object with a visual indicator by adding a visual indicator to the at least one second object;
   wherein the visual indicator visually distinguishes the displayed text for voice calling on the at least one second object to indicate that the displayed text is callable,
   wherein the visual indicator comprises at least one of a quotation mask or a speech bubble applied to the displayed text for voice calling.

9. The method as claimed in claim 8, further comprising performing a task for an identification tag-assigned object when an identification tag is called by the user's voice.

10. The method as claimed in claim 8, further comprising sequentially assigning and displaying identification tags to objects based on a displayed order of the objects.

11. The method as claimed in claim 10, wherein the identification tag is at least one of a number tag having a preset order and an alphabet tag having a preset order.

12. The method as claimed in claim 8, wherein the displaying of the visual indicator includes assigning and displaying the visual indicator to at least one of the at least one first object and the at least one second object that voice calling is possible.

13. An electronic apparatus controlled by a user's voice, the electronic apparatus comprising:
   a memory; and
   a processor coupled to the memory, the processor being configured to:
      control a display to display at least one first object and at least one second object, wherein the at least one second object includes a displayed text for voice calling and the at least one first object does not include the displayed text for voice calling;
      identify that the at least one first object does not include the displayed text for voice calling;
      assign at least one number tag to the at least one first object;
      control the display to display the assigned at least one number tag on the at least one first object; and
      display the at least one second object with a visual indicator by adding a visual indicator to the at least one second object;
   wherein the visual indicator visually distinguishes the displayed text for voice calling on the at least one second object to indicate that the displayed text is callable,
   wherein the visual indicator comprises at least one of a quotation mask or a speech bubble applied to the displayed text for voice calling.

14. The electronic apparatus of claim 13, further comprising a voice input receiver to process a user's voice.

15. The electronic apparatus of claim 13, further comprising the display.

16. The electronic apparatus as claimed in claim 13, wherein the processor performs a task of identifying a tag-assigned object when an identification tag is called by the user's voice.

* * * * *